United States Patent [19]
MacGeorge

[11] 3,713,333
[45] Jan. 30, 1973

[54] FORCE MEASURING APPARATUS

[75] Inventor: William D. MacGeorge, Doylestown, Pa.

[73] Assignee: Testing Technology Corporation, Langhorne, Pa.

[22] Filed: June 24, 1971

[21] Appl. No.: 156,423

[52] U.S. Cl..................73/141 A, 336/30, 177/210
[51] Int. Cl. ...............................................G01l 1/04
[58] Field of Search............73/141 A; 177/210, 211; 336/30

[56] References Cited

UNITED STATES PATENTS

| | | | |
|---|---|---|---|
| 3,433,063 | 3/1969 | Tencate | 73/141 A |
| 2,880,985 | 4/1959 | Roberts | 177/210 X |
| 3,135,112 | 6/1964 | Farley | 73/141 A |
| 3,315,202 | 4/1967 | Johns et al. | 73/141 X |
| 2,421,222 | 5/1947 | Schaevitz | 73/141 A |
| 2,906,865 | 9/1959 | Jefferson | 177/210 X |

FOREIGN PATENTS OR APPLICATIONS

| | | | |
|---|---|---|---|
| 674,540 | 11/1963 | Canada | 73/141 A |
| 445,345 | 6/1927 | Germany | 73/141 A |
| 883,206 | 11/1961 | Great Britain | 73/141 A |
| 447,030 | 3/1948 | Canada | 73/141 A |

Primary Examiner—Charles A. Ruehl
Attorney—Zachary T. Wobensmith, II

[57] ABSTRACT

Force measuring apparatus is described which includes a load spring of unitary construction with a multiple arm spring frame assembly, one arm having a centrally located block which carries a fixedly secured outer winding and the other arm a moveable core within the outer winding, the core being capable of controlled limited axial movement in response to tension or compression forces, such movement thereby providing a signal.

6 Claims, 6 Drawing Figures

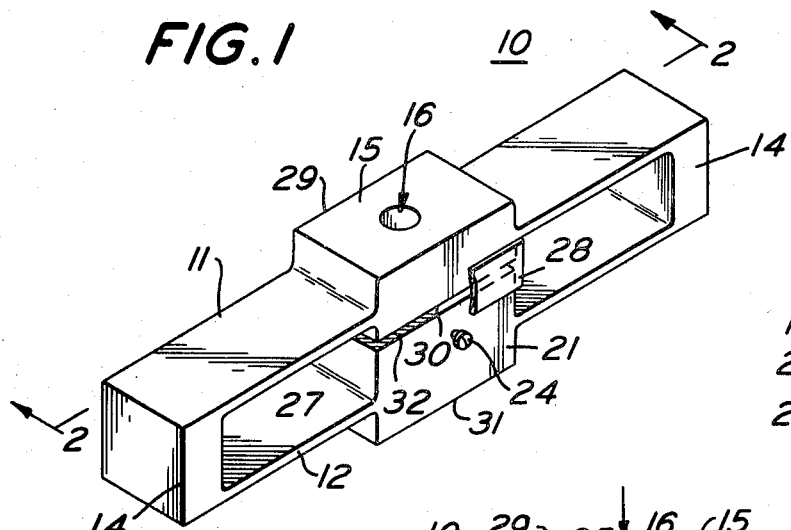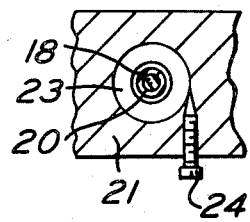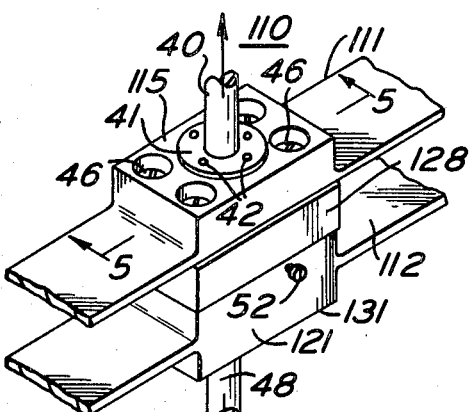
PATENTED JAN 30 1973
3,713,333
INVENTOR
WILLIAM D. MACGEORGE
BY B. T. Wolfensmith
ATTORNEY

FORCE MEASURING APPARATUS

BACKGROUND OF THE INVENTION

1. Field of the Invention

This invention relates to a force measuring apparatus of the load spring type which employs a fixed outer winding with a double arm spring carried core moveable therewithin upon the application of tension or compression forces applied to the spring, the movement thereby providing an axial displacement of the core which results in a signal.

2. Description of the Prior Art

The use of elements carried on spring arms and moved relatively to provide a signal in accordance with the application of forces of tension or compression is well known. Many devices have been proposed for stress and strain testing and their measurement. One such device is shown in the U.S. Pat. to Peters, No. 1,528,627 which has a cantilever element which is attached to a rod and whose movement causes displacement of a stack of metal discs and changes the resistance therein. The U.S. Pat. to Zener et al., No. 2,423,867, shows a spring steel frame in the shape of a FIG. eight with a strain test specimen the longitudinal movement of which specimen permits the frame to expand and affect strain gauges to produce a signal. The stress arrangement of this apparatus is shown in FIG. 2A wherein the test specimen is subjected to compression and the frame contracts thereby causing a reaction on the strain gauges R3, R4 to provide a signal.

The U.S. Pat. No. to Hunt, No. 2,899,191 shows an electrically actuated weighing device wherein beams have strain indicating units mounted thereon. The bending of the beams reacts on the indicating units and provides a signal which is connected into a Wheatstone bridge circuit and thereby provides readings for various weights applied to the beams.

The U.S. Pat. to Ormond, No. 2,918,816 shows a strain gauge balance system for use in a high pressure wind tunnel which includes an outer sleeve, and an inner core with set off portions and torsion load cells between the core and the sleeve. Movement of the core in one of the six directions to be measured will affect the gauges and provide a measure of the strain involved.

The U.S. Pat. to Starr, No. 3,035,240 illustrates a beam diaphragm load cell which includes a lateral diaphragm, a beam formed integrally with the diaphragm and rigid supports fixing the end of the beam and the periphery of the diaphragm. Fluid pressures are applied on both sides of the diaphragm and are transmitted by it to the beam so as to cause it to bend and the strains are sensed by bonded resistance strain gauges. The readings of the gauges provide the magnitude of the pressure differential between the fluid pressures applied on either side of the diaphragm.

The U.S. Pat. to Gindes et al., No. 3,199,057 shows a load cell transducer which includes a load applying member, a hollow body with circular cones and a cylindrical portion. Recesses are provided in the cylindrical portion with strain gauges therein and bonded thereto. The load applied causes forces to be applied on the cylindrical portions nd recesses so that the strain gauges are affected and the output of the strain gauges is transmitted to a Wheatstone bridge circuit for measurement.

The U.S. Pat. to Fluegler, No. 3,218,445 shows a signal multiplier which includes a cylindrical magnet mounted on a base with a plate and cylinder mounted above the base forming an annular air gap between the plate and cylinder. A cylinder with a coil is suspended in the air gap and mounted on a spider. A spring is provided above the spider and has a rod connected to a plate which plate is also connected to a coil. Strain gages are mounted respectively on the top and bottom of the spring. In operation current applied to the coil causes it to move in the air gap thereby deforming the spring and producing deformation of the strain gauges which strain gages are connected to a Wheatstone bridge and thereby multiply the signal that was supplied to the coil.

The U.S. Pat. to Seed, No. 3,258,729 shows a load cell which includes a load supporting strut which is a semi-rectangular shape and carries a gage assembly in a vertical recess which is formed in the center of the strut. The gage assembly has one or more of its strain gages attached to the sides of the recess and so that they are responsive to a load placed on the top of the strut. A load applied to the top of the strut causes the strut to deform the strain gages and provide an output signal, which signal indicates the magnitude of loading that was applied to the top of the strut.

The U.S. Pat. to Farr, No. 3,464,259 shows a mounting for a strain gage assembly, where the mounting consists of a plurality of thin plate-like members rigidly secured together and with the plane of each plate-like member parallel to the expected force application, which is normally in the direction of the strain gage. The mounting is such that all forces applied in the parallel plate plane are transmitted to the strain gage and those forces perpendicular to the plane of the plates causes the plates to flex and such flexure does not affect the strain gages, since the plates are capable of flexing easily.

The structures of the prior art have various shortcomings, including complexity and difficulty of construction, lack of linearity, and lack of sensitivity. The apparatus of the invention is simple in construction, has a double arm spring mounting which is free from likelihood of operating difficulties, is capable of being used for both tension and compression force applications, and possesses many other advantages not found in the structures of the prior art.

SUMMARY OF THE INVENTION

A force measuring apparatus is provided having double arm load spring with a fixed winding held in one of the spring arms and a core held in another spring arm with controlled relative movement of the core and winding providing readings to indicate the forces applied thereon.

The principal object of the invention is to provide a force measuring apparatus which has a positive overload protection.

A further object of the invention is to provide a force measuring apparatus which can be piggybacked for multi-range load requirements.

A further object of the invention is to provide a force measuring apparatus which is of low profile.

A further object of the invention is to provide a force measuring apparatus which has excellent lateral stability.

A further object of the invention is to provide a force measuring apparatus which has a high output.

A further object of the invention is to provide a force measuring apparatus which has excellent linearity and hystersis characteristics.

A further object of the invention is to provide a force measuring apparatus wherein the output of several units can be added directly to obtain a high output average reading.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part thereof, in which:

FIG. 1 is a view in perspective of one embodiment of the apparatus in accordance with the invention, parts being broken away to illustrate the details of construction;

FIG. 2 is a vertical sectional view, enlarged, taken approximately on the line 2—2 of FIG. 1;

FIG. 3 is a horizontal sectional view taken approximately on the line 3—3 of FIG. 2;

FIG. 4 is a fragmentary perspective view in partial section of another embodiment of the invention;

FIG. 5 is a vertical sectional view, enlarged, taken approximately on the line 5—5 of FIG. 4; and FIG. 6 is a view showing stacking or piggybacking of high and low force measuring elements.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings in FIGS. 1 to 3 thereof, the force measuring apparatus there shown includes an outer metal frame 10 preferably of tool steel, which frame 10, is of unitary construction and has a horizontal top arm member 11 and horizontal bottom arm member 12, the top and bottom arm members 11 and 12 being connected at the respective left and right hand sides as seen in FIG. 1, by vertical side walls 14. The top arm member 11 has a central block portion 15 which extends transversely across the member and includes a central opening 16 with a shoulder 17 with which a nut 19 on a threaded rod 18 is engaged. The rod 18 has a core 20 attached thereto at its lower end. The block portion 15 has an outer face 29 for force application thereagainst and an inner stop face 30. The bottom member 12 has a central block portion 21 of rectangular configuration extending transversely across wall 12 with a central bore 22 with a winding 23 of well known type, constituting a linear variable differential transformer LVDT to serve as a signal source providing a signal responsive to its positioning. The winding 23 is secured in the bore 22 therein by a screw 24. The winding 23 has a central longitudinal bore 25 within which the core 20 is vertically moveable and which provides with the core 20 an annular air gap 26.

The block portion 21 has an outer face 31 for force application and an inner stop face 32. The inner face 32 forms a lower boundary for an air gap 27 and the face 30 forms an upper boundary for the air gap 27 which normally separates the block portions 15 and 21. A flexible dust cover 28 of rubber or like material is provided which encircles the central block portions 15 and 21 and seals the gap 27 to prevent the entry of dust or moisture therein.

Referring now more particularly to FIGS. 4 and 5, the embodiment of the invention therein illustrated is suitable for tension force measurement and includes a frame 110 with a top arm member 111 and a bottom arm member 112 similar to the members 11 and 12. The upper arm member 111 has a central block portion 115 of rectangular configuration with a central opening 116 within which a tension application rod 40 extends. The rod 40 has a connecting plate 41 secured thereto which is secured to the top face 129 of the block 115 by screws 42.

The block 115 has recessed openings 44 with shoulders 45 with cap screws 46 disposed therein. The cap screws 46 are engaged in a lower block 121 of the lower arm member 112. The cap screws 46 have heads 47 spaced a predetermined and selected distance from the shoulders 45 to serve as stops and limit the separation of the blocks 115 and 121.

A rod 48 is secured to a connecting plate 49 which is in turn secured to the outer face 131 of the lower block 121 by screws 50.

A gap 127 is provided between the faces 130 and 132 of the blocks 115 and 121 which gap is covered by an outer flexible dust cover 128 which extends therearound.

In the lower block 121 a coil winding 123 is provided which is fixedly mounted therein and held against displacement by a transverse screw 52. The upper block 115 has a core 120 adjustably carried therein in a central opening 116 on a threaded rod 118. A lock nut 117 carried on the rod 118 permits of locking the rod at the desired adjusted position of the core 120 in the coil winding 123.

The core 120 and coil winding 123 constitute a linear variable differential transformer LVDT to serve as a signal source.

The mode of operation will now be pointed out.

For compression force measurement the embodiment of FIGS. 1 to 3 is used with force application directed against either one of the outer faces 29 or 31 of the blocks 15 and 21, the other face being fixedly mounted.

The upper nd lower arm members 11 and 12 flex with restraint inherent in the shape of the frame 10 and the members 11 and 12 against transverse distortion. The central loading on the blocks 15 and 21 obviates the angularity of a cantilever.

Relative movement of the blocks 15 and 21 causes the core 20 to move in respect to the winding 23 which movement causes a change in the electrical field in the coil and such change provides a signal which can be fed into an appropriate circuit to indicate the force magnitude.

Movement of the blocks 15 and 21 is limited to the movement required to close the gap 27, and additional force applied on blocks 15 and 21 will not adversely affect the apparatus.

If tension forces are to be measured then the embodiment shown in FIGS. 4 and 5 is utilized. Tension forces are applied to rods 40 and 48 which moves the discs 41 and 50 and block portions 115 and 121 to which they are connected. This movement causes the core 120 to move axially in winding 123 causing a change in its electrical field, to provide a signal which can be fed into appropriate circuitry indicating the magnitude of forces involved.

Referring now to FIG. 6 two force measuring apparatuses 210 and 310 are shown in a piggyback relationship. The apparatus 210 in this embodiment can have a force range of ten pounds and the apparatus 310 has a force range of ten to a thousand pounds. The various components of the apparatuses 210 and 310 are the same as the apparatus described above except that the size is increased or decreased to suit the forces involved. This piggyback apparatus is useful when multi-range force measurement is desired.

It will thus be seen that measuring apparatus with an improved spring has been provided with which the objects of the invention are attained.

I claim:

1. Force measuring apparatus which comprises
an outer unitary frame having a pair of spaced arms of rectangular cross section connected by side walls,
said spaced arms each having an inner and outer face,
said side walls each having a cross section a plurality of times that of said spaced arms and said spaced arms having their longitudinal axes perpendicular to the longitudinal axes of said side walls,
each of said arms having a centrally located block with outer and inner faces offset outwardly from the faces of said arms,
said inner faces of said blocks limiting the relative motion of said arms, and
signal mans having portions carried by each of said blocks and responsive to the relative movement of said blocks.

2. Force measuring apparatus as defined in claim 1 in which
said blocks have said outer faces for force application with respect thereto.

3. Force measuring apparatus as defined in claim 2 in which
said blocks have said outer faces for application of compression forces with respect thereto.

4. Force measuring apparatus as defined in claim 2 in which
said blocks have connecting members for application of forces in tension thereon.

5. Force measuring apparatus as defined in claim 1 in which
means for limiting block movement is provided which comprises members carried by one of said blocks for engagement with shoulders on the other of said blocks.

6. Force measuring apparatus as defined in claim 1 in which said signal means is a linear variable differential transformer.

* * * * *